US012634751B2

(12) United States Patent
Kanamarlapudi et al.

(10) Patent No.: US 12,634,751 B2
(45) Date of Patent: May 19, 2026

(54) RECOVERY AFTER PACKET DATA CONVERGENCE PROTOCOL PACKET DISCARD

(71) Applicant: QUALCOMM Incorporated, San Diego, CA (US)

(72) Inventors: Sitaramanjaneyulu Kanamarlapudi, San Diego, CA (US); Harish Bhandiwad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 17/653,018

(22) Filed: Mar. 1, 2022

(65) Prior Publication Data

US 2022/0286907 A1 Sep. 8, 2022

Related U.S. Application Data

(60) Provisional application No. 63/156,087, filed on Mar. 3, 2021.

(51) Int. Cl.
*H04W 28/06* (2009.01)
*H04L 1/1867* (2023.01)
(Continued)

(52) U.S. Cl.
CPC ........... *H04W 28/06* (2013.01); *H04L 1/1874* (2013.01); *H04L 47/32* (2013.01); *H04W 28/04* (2013.01)

(58) Field of Classification Search
CPC ..... H04W 28/06; H04W 28/04; H04W 28/02; H04W 28/12; H04W 28/0205;
(Continued)

(56) References Cited

U.S. PATENT DOCUMENTS

2006/0031527 A1* 2/2006 Soles .................... H04L 69/163
709/227
2008/0144633 A1* 6/2008 Woloszynski ........ H04L 1/1867
370/395.31
(Continued)

OTHER PUBLICATIONS

International Search Report and Written Opinion—PCT/US2022/070923—ISA/EPO—Jun. 9, 2022.
(Continued)

*Primary Examiner* — Un C Cho
*Assistant Examiner* — Rasha K Fayed
(74) *Attorney, Agent, or Firm* — Harrity & Harrity, LLP

(57) ABSTRACT

Various aspects of the present disclosure generally relate to wireless communication. In some aspects, a radio bearer may detect, at a packet data convergence protocol (PDCP) layer, expiry of a timer associated with a packet for transmission. The radio bearer may be configured to discard the packet upon expiry of the timer. Accordingly, the radio bearer may re-enqueue, at a modem of the radio bearer or at an application layer of the radio bearer and based at least in part on detecting expiry of the timer, the packet as a new packet for transmission before discarding the packet. Additionally, or alternatively, the radio bearer may retransmit the packet based at least in part on instructions from an application, executed on one or more processors of the radio bearer, that received the packet from the PDCP layer before the packet was discarded. Numerous other aspects are described.

29 Claims, 9 Drawing Sheets

(51) Int. Cl.
H04L 47/32 (2022.01)
H04W 28/04 (2009.01)

(58) Field of Classification Search
CPC ... H04W 28/065; H04W 40/02; H04W 74/08;
H04W 72/21; H04W 76/00; H04W 76/19;
H04W 76/12; H04W 76/27; H04W 76/50;
H04W 76/28; H04W 88/06; H04W 8/18;
H04W 80/02; H04W 80/08; H04W
36/023; H04W 36/0038; H04W 36/08;
H04W 36/02; H04W 12/0431; H04W
12/04; H04W 12/08; H04W 92/10; H04L
1/1874; H04L 1/1887; H04L 1/08; H04L
1/1864; H04L 1/188; H04L 1/1867; H04L
1/1829; H04L 1/0045; H04L 1/0061;
H04L 1/1812; H04L 47/32; H04L 47/34;
H04L 47/28; H04L 47/30; H04L 47/283;
H04L 69/163; H04L 69/162; H04L 69/16;
H04L 69/04; H04L 69/28; H04L 69/324;
H04L 67/01; H04L 2001/0097; H04L
47/31; H04L 47/50; H04L 47/6255
See application file for complete search history.

(56) References Cited

U.S. PATENT DOCUMENTS

| | | | | |
|---|---|---|---|---|
| 2009/0175241 | A1* | 7/2009 | Ohta | H04W 36/023 |
| | | | | 370/331 |
| 2012/0195323 | A1* | 8/2012 | Gupta | G06F 21/552 |
| | | | | 370/419 |
| 2012/0201228 | A1* | 8/2012 | Wu | H04W 76/19 |
| | | | | 370/336 |
| 2014/0157009 | A1* | 6/2014 | Kherani | G06F 1/3278 |
| | | | | 713/300 |
| 2014/0157365 | A1* | 6/2014 | Janakiraman | H04L 63/101 |
| | | | | 726/3 |
| 2014/0328256 | A1* | 11/2014 | Djukic | H04L 1/0045 |
| | | | | 370/329 |
| 2016/0006675 | A1* | 1/2016 | Takase | H04L 41/0896 |
| | | | | 709/223 |
| 2016/0286438 | A1* | 9/2016 | Weingertner | H04W 36/00226 |
| 2016/0338132 | A1* | 11/2016 | Uchino | H04L 5/001 |
| 2016/0353356 | A1* | 12/2016 | Payyappilly | H04L 47/193 |
| 2016/0381598 | A1* | 12/2016 | Chan | H04L 69/22 |
| | | | | 370/474 |
| 2017/0171905 | A1* | 6/2017 | Uchino | H04W 36/04 |
| 2017/0250929 | A1* | 8/2017 | Ko | H04L 47/32 |
| 2019/0044878 | A1* | 2/2019 | Steffen | H04L 47/34 |
| 2020/0015302 | A1* | 1/2020 | Shikari | H04L 43/0876 |
| 2020/0021532 | A1 | 1/2020 | Borikar et al. | |
| 2020/0084668 | A1* | 3/2020 | Eriksson | H04W 28/14 |
| 2020/0183732 | A1* | 6/2020 | Cornett | H04L 49/901 |
| 2020/0274816 | A1* | 8/2020 | Chu | H04L 41/0893 |
| 2020/0287804 | A1* | 9/2020 | Dalela | H04L 43/067 |
| 2020/0389277 | A1* | 12/2020 | Jia | H04W 72/541 |
| 2020/0396275 | A1* | 12/2020 | Zhu | H04L 67/131 |
| 2021/0084129 | A1* | 3/2021 | Jiang | H04L 5/0058 |
| 2021/0337594 | A1* | 10/2021 | Xin | H04L 47/50 |
| 2022/0070738 | A1* | 3/2022 | Tripathi | H04W 28/0215 |
| 2022/0263927 | A1* | 8/2022 | Jin | H04W 28/06 |
| 2022/0321492 | A1* | 10/2022 | Wei | H04L 47/125 |
| 2023/0007084 | A1* | 1/2023 | Dou | H04L 41/5009 |
| 2024/0015849 | A1* | 1/2024 | Teyeb | H04W 76/20 |

OTHER PUBLICATIONS

Li X., et al., "Throughput Analysis For a Multi-User, Multi-Channel
ALOHA Cognitive Radio System", IEEE Transactions on Wireless
communications, IEEE Service Center, Piscataway, NJ, US, vol. 11,
No. 11, Nov. 1, 2012 (Nov. 1, 2012), pp. 3900-3909, XP011482443,
ISSN: 1536-1276, DOI: 10.1109/TWC.2012.092112.111425 para-
graph [00II].

* cited by examiner

Detect, at a PDCP layer, expiry of a timer associated with a packet for transmission, wherein the packet is to be discarded upon expiry of the timer

610

Re-enqueue, based at least in part on detecting expiry of the timer, the packet as a new packet for transmission before discarding the packet

620

600

710 Detect, at a PDCP layer, expiry of a timer associated with a packet for transmission, wherein the packet is to be discarded upon expiry of the timer 720 Retransmit the packet based at least in part on instructions from an application that received the packet from the PDCP layer before the packet was discarded

700

RECOVERY AFTER PACKET DATA CONVERGENCE PROTOCOL PACKET DISCARD

CROSS-REFERENCE TO RELATED APPLICATION

This Patent Application claims priority to U.S. Provisional Patent Application No. 63/156,087, filed on Mar. 3, 2021, entitled "RECOVERY AFTER PACKET DATA CONVERGENCE PROTOCOL PACKET DISCARD," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for recovery after discard of a packet data convergence protocol packet.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a radio bearer. The radio bearer may include a memory and one or more processors coupled to the memory. The one or more processors may be configured to detect, at a packet data convergence protocol (PDCP) layer, expiry of a timer associated with a packet for transmission, wherein the radio bearer is configured to discard the packet upon expiry of the timer. The one or more processors may be further configured to re-enqueue, at a modem of the radio bearer or at an application layer of the radio bearer and based at least in part on detecting expiry of the timer, the packet as a new packet for transmission before discarding the packet.

Some aspects described herein relate to a radio bearer. The radio bearer may include a memory and one or more processors coupled to the memory. The one or more processors may be configured to detect, at a PDCP layer, expiry of a timer associated with a packet for transmission, wherein the radio bearer is configured to discard the packet upon expiry of the timer. The one or more processors may be further configured to retransmit the packet based at least in part on instructions from an application, executed on the one or more processors, that received the packet from the PDCP layer before the packet was discarded.

Some aspects described herein relate to a method of wireless communication performed by a radio bearer. The method may include detecting, at a PDCP layer, expiry of a timer associated with a packet for transmission, wherein the radio bearer is configured to discard the packet upon expiry of the timer. The method may further include re-enqueuing, based at least in part on detecting expiry of the timer, the packet as a new packet for transmission before discarding the packet.

Some aspects described herein relate to a method of wireless communication performed by a radio bearer. The method may include detecting, at a PDCP layer, expiry of a timer associated with a packet for transmission, wherein the radio bearer is configured to discard the packet upon expiry of the timer. The method may further include retransmitting the packet based at least in part on instructions from an application, executed on one or more processors of the radio bearer, that received the packet from the PDCP layer before the packet was discarded.

Some aspects described herein relate to a non-transitory computer-readable medium that stores a set of instructions for wireless communication by a radio bearer. The set of instructions, when executed by one or more processors of the radio bearer, may cause the radio bearer to detect, at a PDCP layer, expiry of a timer associated with a packet for transmission, wherein the radio bearer is configured to discard the packet upon expiry of the timer. The set of instructions, when executed by one or more processors of the radio bearer, may further cause the radio bearer to re-enqueue, based at least in part on detecting expiry of the timer, the packet as a new packet for transmission before discarding the packet.

Some aspects described herein relate to a non-transitory computer-readable medium that stores a set of instructions for wireless communication by a radio bearer. The set of instructions, when executed by one or more processors of the radio bearer, may cause the radio bearer to detect, at a PDCP layer, expiry of a timer associated with a packet for transmission, wherein the radio bearer is configured to discard the packet upon expiry of the timer. The set of instructions, when executed by one or more processors of the radio bearer, may further cause the radio bearer to retransmit the packet based at least in part on instructions from an application, executed on the one or more processors, that received the packet from the PDCP layer before the packet was discarded.

Some aspects described herein relate to an apparatus for wireless communication. The apparatus may include means for detecting, at a PDCP layer, expiry of a timer associated with a packet for transmission, wherein the apparatus is configured to discard the packet upon expiry of the timer. The apparatus may further include means for re-enqueuing, based at least in part on detecting expiry of the timer, the packet as a new packet for transmission before discarding the packet.

Some aspects described herein relate to an apparatus for wireless communication. The apparatus may include means for detecting, at a PDCP layer, expiry of a timer associated with a packet for transmission, wherein the apparatus is configured to discard the packet upon expiry of the timer. The apparatus may further include means for retransmitting the packet based at least in part on instructions from an application, executed on one or more processors of the apparatus, that received the packet from the PDCP layer before the packet was discarded.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
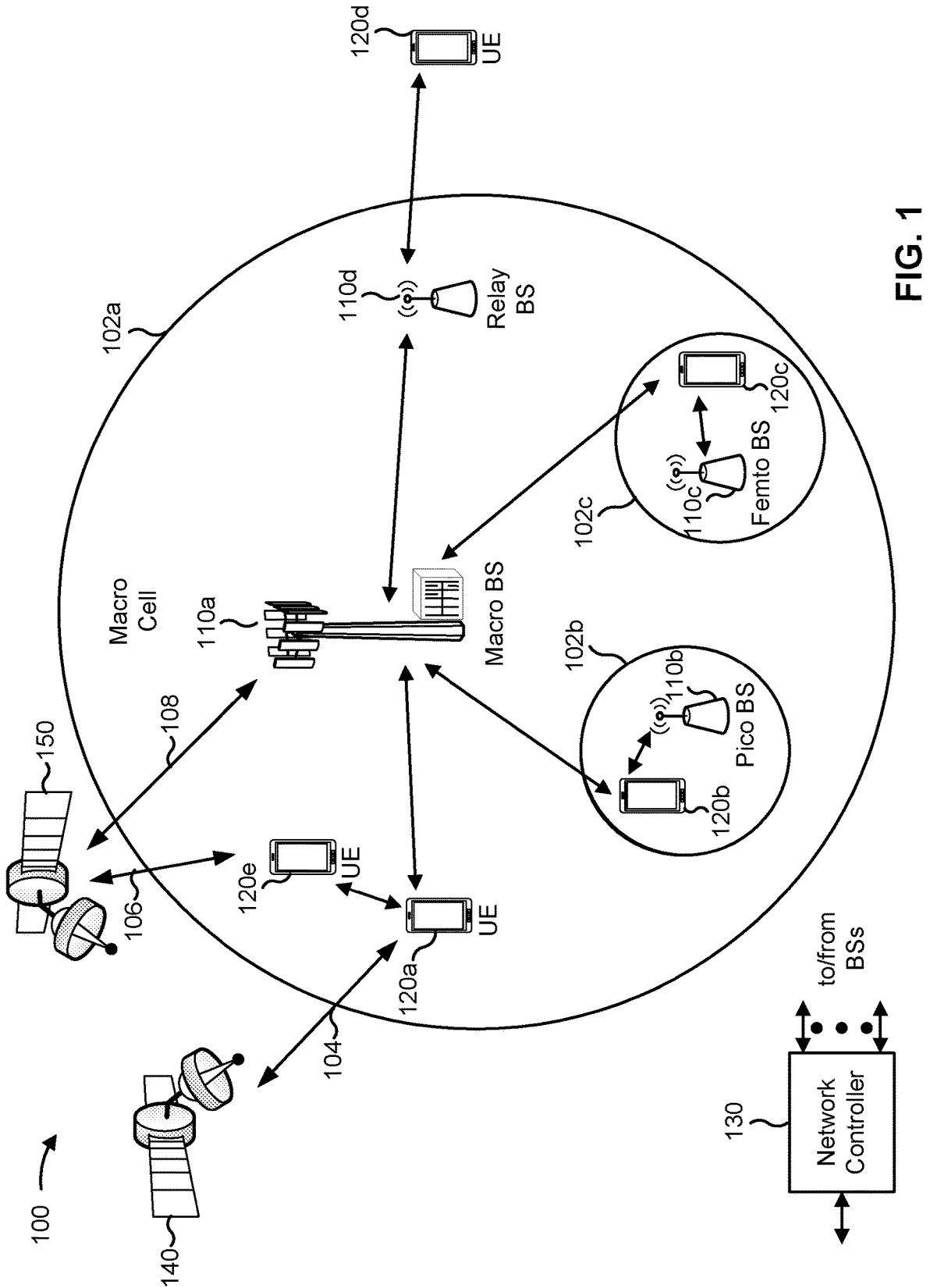
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network node" or "network entity" may refer to an aggregated base station, a disaggregated base station (e.g., described above), an integrated access and backhaul (IAB) node, a relay node, and/or one or more components thereof. For example, in some aspects, "base station," "network node," or "network entity" may refer to a CU, a DU, an RU, a Near-Real Time (Near-RT) RAN Intelligent Controller (MC), or a Non-Real Time (Non-RT) MC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher frequency operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As further shown in FIG. 1, example 100 includes a regenerative satellite deployment and a transparent satellite deployment in a non-terrestrial network (NTN). In one example of a regenerative satellite deployment, the UE 120a is served by a satellite 140 via a service link 104. For example, the satellite 140 may include a BS or a gNB. In some aspects, the satellite 140 may be referred to as a non-terrestrial base station, a regenerative repeater, or an on-board processing repeater. In some aspects, the satellite 140 may demodulate an uplink radio frequency signal and may modulate a baseband signal derived from the uplink radio signal to produce a downlink radio frequency transmission. The satellite 140 may transmit the downlink radio frequency signal on the service link 104. The satellite 140 may provide a cell that covers the UE 120a.

In one example of a transparent satellite deployment, which may also be referred to as a bent-pipe satellite deployment, the UE 120e is served by a satellite 150 via the service link 106. The satellite 150 may be a transparent satellite. The satellite 150 may relay a signal received from a gateway (e.g., the BS 110a in example 100) via a feeder link 108. For example, the satellite 150 may receive an uplink radio frequency transmission and may transmit a downlink radio frequency transmission without demodulating the uplink radio frequency transmission. In some aspects, the satellite 150 may frequency convert the uplink radio frequency transmission received on the service link 106 to a frequency of the uplink radio frequency transmission on the feeder link 108 and may amplify and/or filter the uplink radio frequency transmission. In some aspects, the UE 120e may be associated with a global navigation satellite system (GNSS) capability and/or a global positioning system (GPS) capability, though not all UEs have such capabilities. The satellite 150 may provide a cell that covers UE 120.

The service link 106 may include a link between the satellite 150 and the UE 120e, and the service link 106 may include one or more of an uplink or a downlink. The feeder link 108 may include a link between the satellite 150 and the BS 110a and may include one or more of an uplink (e.g., from the UE 120e to the BS 110a) or a downlink (e.g., from the BS 110a to the UE 120e).

The service links 104 and 106 and the feeder link 108 may each experience Doppler effects due to the movement of the satellites 140 and 150, and potentially movement of the UE 120e. These Doppler effects may be significantly larger than in a terrestrial network. The Doppler effect on the feeder link 108 may be compensated for to some degree, but the feeder link 108 may still be associated with some amount of uncompensated frequency error. Furthermore, the BS 110a may be associated with a residual frequency error, and/or the satellite 140 or the satellite 150 may be associated with an on-board frequency error. These sources of frequency error may cause a received downlink frequency at the UE 120 to drift from a target downlink frequency.

As indicated above, FIG. 1 is provided as an example. Other examples may differ from what is described with regard to FIG. 1.

Figure 2:
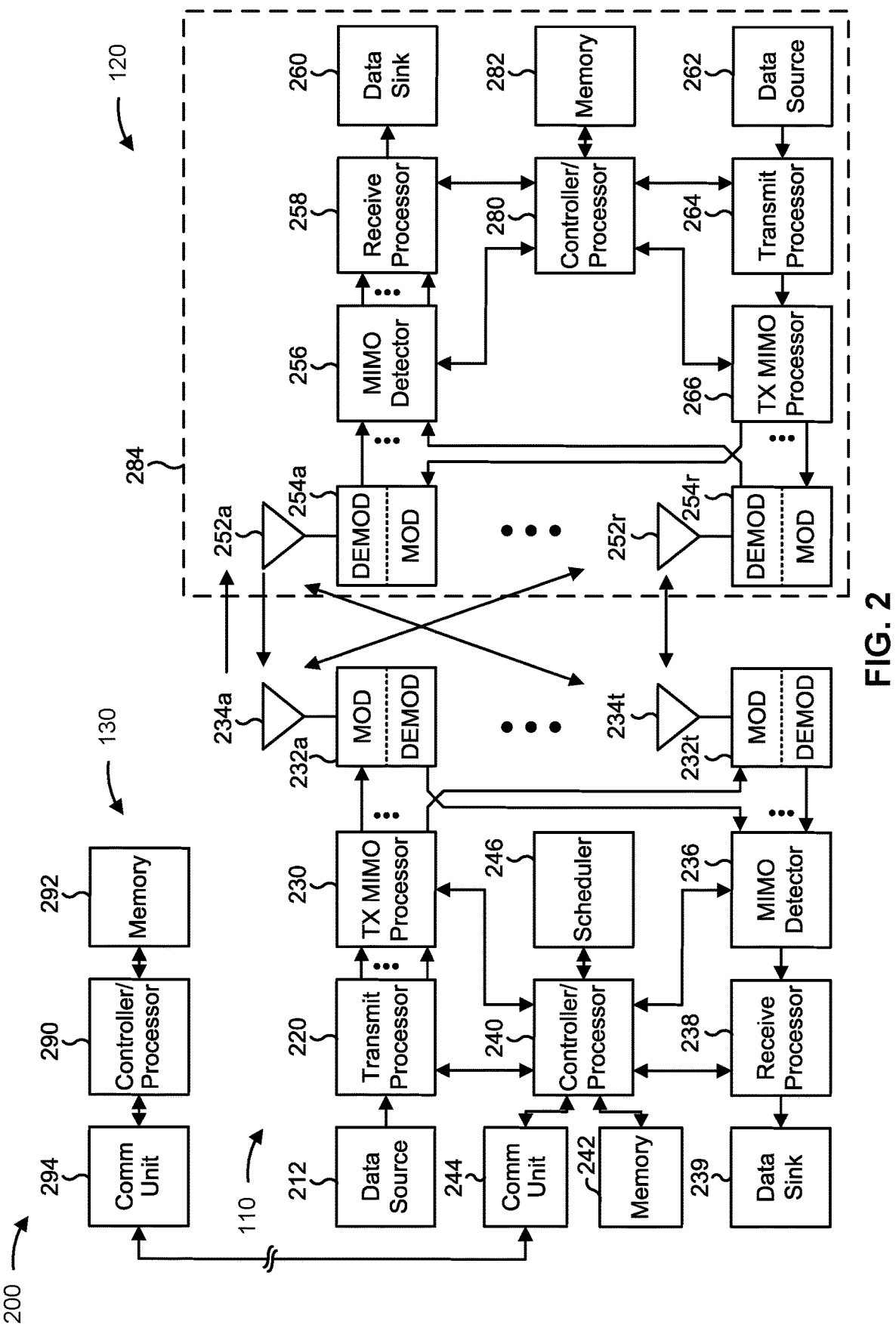
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit

244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with recovery after discard of a PDCP packet, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples. In some aspects, a radio bearer described herein is the UE 120, is included in the UE 120, or includes one or more components of the UE 120 shown in FIG. 2. As an alternative, a radio bearer described herein is the base station 110, is included in the base station 110, or includes one or more components of the base station 110 shown in FIG. 2.

In some aspects, a radio bearer (e.g., the UE 120 and/or apparatus 800 of FIG. 8, or network entity 401 and/or the apparatus 900 of FIG. 9) may include means for detecting, at a PDCP layer, expiry of a timer associated with a packet for transmission, wherein the radio bearer is configured to discard the packet upon expiry of the timer; and/or means for re-enqueuing, at a modem of the radio bearer or at an application layer of the radio bearer and based at least in part on detecting expiry of the timer, the packet as a new packet for transmission before discarding the packet. In some aspects, the means for the radio bearer to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. As an alternative, the means for the radio bearer to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a radio bearer (e.g., the UE 120 and/or apparatus 800 of FIG. 8, or network entity 401 and/or the apparatus 900 of FIG. 9) may include means for detecting, at a PDCP layer, expiry of a timer associated with a packet for transmission, wherein the radio bearer is configured to discard the packet upon expiry of the timer; and/or means for retransmitting the packet based at least in part on instructions from an application, executed on one or more processors of the radio bearer, that received the packet from the PDCP layer before the packet was discarded. In some aspects, the means for the radio bearer to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. As an alternative, the means for the radio bearer to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
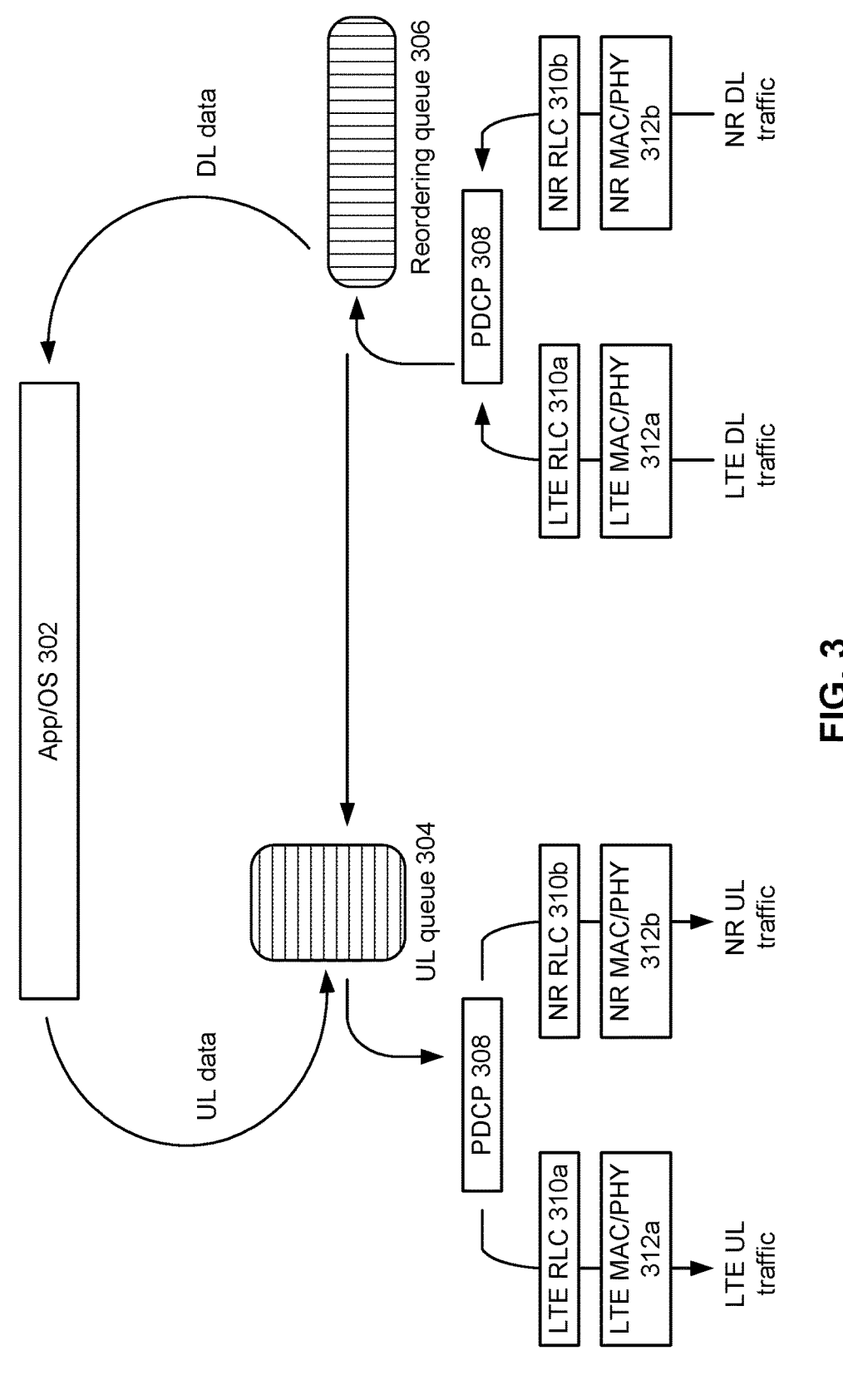
FIG. 3 is a diagram illustrating an example of a protocol stack for a radio bearer, in accordance with the present disclosure.

FIG. 3 is a diagram illustrating an example 300 of a protocol stack for a radio bearer, in accordance with the present disclosure. Example 300 may be implemented in a radio bearer, such as a UE 120, that receives data on a downlink (e.g., from a network entity and/or another UE) and transmits data on an uplink (e.g., from the network entity and/or another UE).

As shown in FIG. 3, example 300 includes an application and/or an operating system (shown as "App/OS" in FIG. 3) 302 that is executed using at least one processor and at least one memory of the radio bearer. The App/OS 302 may request that data (shown as "UL Data" in FIG. 3) be transmitted to a remote server, and that data may be added to an uplink queue (UL queue) 304 based at least in part on that request. In some aspects, the data may include one or more packets (e.g., a protocol data unit (PDU) and/or another packet). A modem of the radio bearer may process the request from the App/OS 302 and add the packet to the UL queue 304.

Similarly, the App/OS 302 may receive data (shown as "DL data" in FIG. 3) from a reordering queue 306. In some aspects, the data may include one or more packets (e.g., a PDU and/or another packet). The modem of the radio bearer may receive the data from a network stack (e.g., as described below) and add the packet to the reordering queue 306.

As further shown in FIG. 3, the radio bearer may implement a network stack that includes a PDCP layer 308, a radio link control (RLC) layer 310, and one or more lower layers, such as a medium access control (MAC) layer and a physical layer (shown as "MAC/PHY" in FIG. 3) 312. For example, the PDCP layer 308 may add headers to and perform ciphering for outgoing data packets in the UL queue 304. Similarly, the PDCP layer 308 may decode headers and remove ciphering for incoming data packets that are passed to the reordering queue 306. As further shown in FIG. 3, the RLC layer 310 may include at least one RLC layer 310a for legacy communications (e.g., over an LTE network or another legacy wireless network) and at least one RLC layer 310b for NR communications. The RLC layer 310 may implement automatic repeat request (ARQ) sessions, perform error correction when decoding data received by the MAC/PHY layer 312, and/or reorder packets received using the MAC/PHY layer 312 or transmitted using the MAC/PHY layer 312. As further shown in FIG. 3, the MAC/PHY layer 312 may include at least one MAC/PHY layer 312a for legacy communications (e.g., over an LTE network or another legacy wireless network) and at least one MAC/PHY layer 312b for NR communications. The MAC/PHY layer 312 may generate frames for transmitting packets from the RLC layer 310 or recognize frames received over-the-air (OTA) and pass those frames as packets to the RLC layer 310. Additionally, in some aspects, the MAC/PHY layer 312 may add destination addresses to frames and transmit those frames OTA or decode destination addresses from received frames and pass frames addressed to the radio bearer as packets to the RLC layer 310.

As indicated above, FIG. 3 is provided as an example. Other examples may differ from what is described with respect to FIG. 3.

Figure 4:
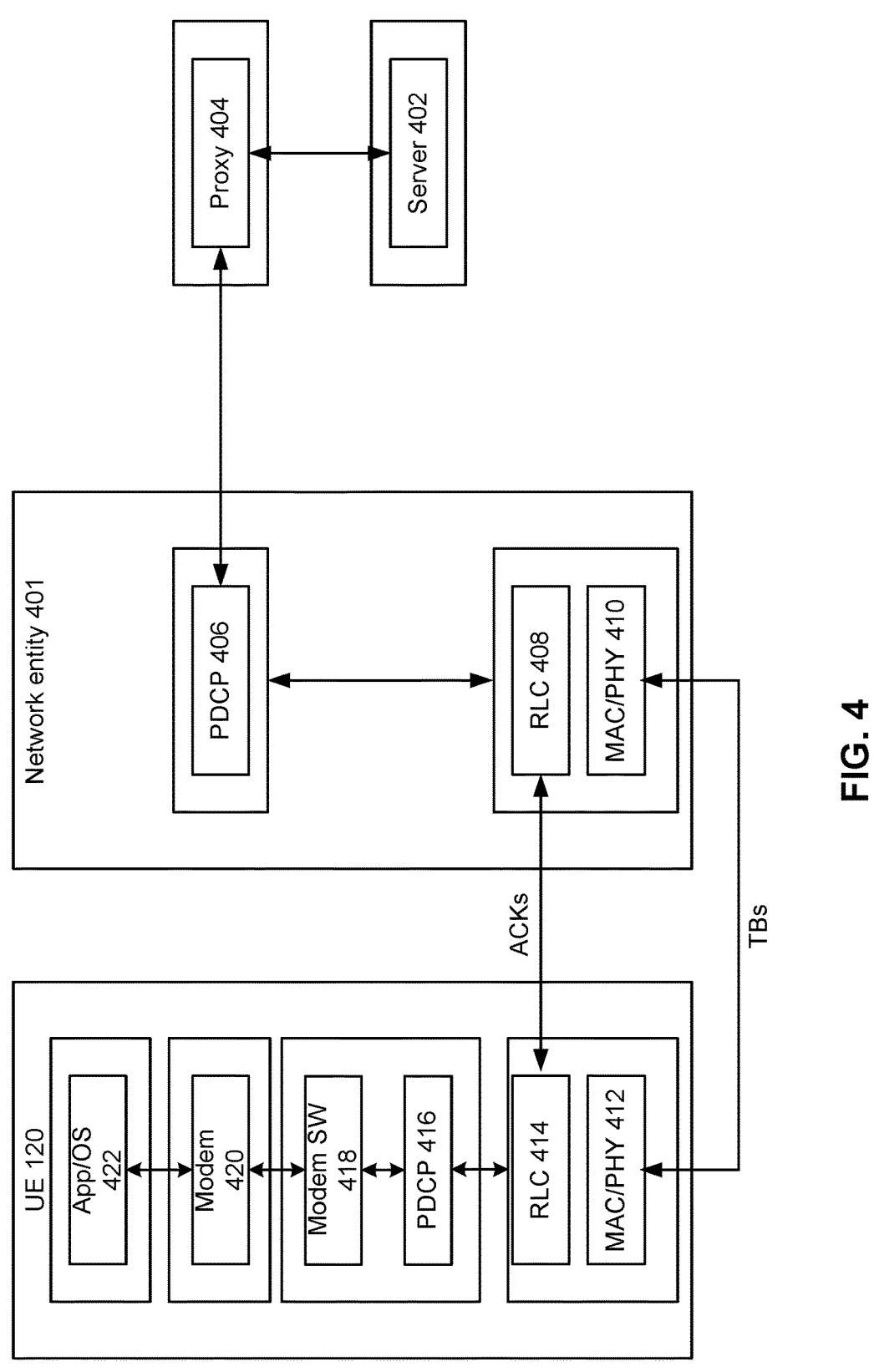
FIG. 4 is a diagram illustrating an example of downlink and uplink between a base station and a UE, in accordance with the present disclosure.

FIG. 4 is a diagram illustrating an example 400 of downlink and uplink between a network entity 401 and a UE 120, in accordance with the present disclosure. In example 400, a downlink may begin with server 402 transferring data, that has been requested by or is addressed to an application and/or operating system (shown as "App/OS") 422 of UE 120, to the network entity 401. The data may include one or more packets (e.g., a PDU and/or another packet). In some aspects, as shown in FIG. 4, the server 402 may transfer the data to the network entity 401 via a proxy (e.g., a gateway and/or another device connected to the network entity 401 through a wired and/or wireless backhaul).

The network entity 401 may process the data at a PDCP layer 406 (which may, for example, be part of a CU of the network entity 401). For example, as described above with respect to FIG. 3, the PDCP layer 406 may add headers to and perform ciphering for the packet(s). Accordingly, the PDCP layer 406 may push the processed data to a data link layer of the network entity 401 (which may, for example, be part of a DU of the network entity 401). For example, the PDCP layer 406 may use an F1 interface to communicate with the data link layer.

As further shown in FIG. 4, the data link layer may include an RLC layer 408 and a MAC/PHY layer 410. As described above with respect to FIG. 3, the RLC layer 408 may reorder the packet(s) to be transmitted (e.g., OTA using a Uu interface with the UE 120) using the MAC/PHY layer 410. Additionally, in some aspects, the RLC layer 408 may implement ARQ. For example, as shown in FIG. 4, the RLC layer 408 may transmit acknowledgement signals (ACKs) and negative-acknowledgement signals (NACKs) to the UE 120. As described above with respect to FIG. 3, the MAC/PHY layer 410 may generate one or more frames for transmitting the packet(s) from the RLC layer 408, add destination addresses to the frame(s), and transmit the frame(s) OTA to the UE 120.

Accordingly, the MAC/PHY layer 412 of the UE 120 may recognize one or more frames received OTA from the network entity 401, decode destination addresses from the received frame(s), and pass the frame(s) as one or more packets to the RLC layer 414. Furthermore, the RLC layer 414 may perform error correction when decoding the packet(s) and, in some cases, reorder the packet(s) received from the MAC/PHY layer 412. The RLC layer 414 may transmit, to the network entity 401, ACKs for decoded packets and NACKs for packets that fail to decode.

The RLC layer 414 may further pass the packet(s) to a PDCP layer 416. As described above with respect to FIG. 3, the PDCP layer 416 may decode headers and remove ciphering for the packet(s) before passing the packet(s) to the software 418. The software 418 may then pass the data from the packet(s) to the App/OS 422 through the modem 420.

Similarly, in example 400, an uplink may begin with App/OS 422 pushing data, that has been requested by or is addressed to server 402, to a modem 420 of the UE 120. The data may include one or more packets (e.g., a PDU and/or another packet). In some aspects, as shown in FIG. 4, the App/OS 422 may push the data from a processor and/or a memory of the UE 120 to another part of a chipset of the UE 120 and/or to another chip included in the UE 120, where that chip and/or that portion of the chipset includes the hardware for modem 420. Software 418 associated with the modem 420 (e.g., a driver and/or another set of computerized instructions) may pass the packet(s) to an uplink queue associated with a PDCP layer 416.

The PDCP layer 416 may further process the data before the packet(s) are transmitted OTA (e.g., by the RLC layer 414 and the MAC/PHY layer 412). For example, as described above with respect to FIG. 3, the PDCP layer 416 may add headers to and perform ciphering for the packet(s). Accordingly, the PDCP layer 416 may push the processed data to a data link layer of the UE 120.

As further shown in FIG. 4, the data link layer may include the RLC layer 414 and the MAC/PHY layer 412. As described above with respect to FIG. 3, the RLC layer 414 may reorder the packet(s) to be transmitted (e.g., OTA using a Uu interface with the network entity 401) using the MAC/PHY layer 412. Additionally, in some aspects, the RLC layer 414 may implement ARQ. For example, as shown in FIG. 4, the RLC layer 414 may transmit ACKs and NACKs to the network entity 401. As described above with respect to FIG. 3, the MAC/PHY layer 412 may generate one or more frames for transmitting the packet(s) from the RLC layer 414, add destination addresses to the frame(s), and transmit the frame(s) OTA to the network entity 401.

Accordingly, the MAC/PHY layer 410 of the network entity 401 may recognize one or more frames received OTA from the UE 120, decode destination addresses from the received frame(s), and pass the frame(s) as one or more packets to the RLC layer 408. Furthermore, the RLC layer 408 may perform error correction when decoding the packet(s) and, in some cases, reorder the packet(s) received from the MAC/PHY layer 410. The RLC layer 408 may transmit, to the UE 120, ACKs for decoded packets and NACKs for packets that fail to decode.

The RLC layer 408 may further pass the packet(s) to a PDCP layer 406. As described above with respect to FIG. 3, the PDCP layer 406 may decode headers and remove ciphering for the packet(s) before passing the data from the packet(s) to the server 402. For example, the server 402 may receive the data via the proxy 404.

Generally, when a PDCP layer of a radio bearer does not receive confirmation that a queued packet (such as a PDU) has been delivered (e.g., by a MAC layer and/or a physical layer) within an amount of time (e.g., after expiry of discardTimer as defined in 3GPP Technical Specification (TS) 38.323 and/or another standard), the PDCP layer discards the queued packet. This results in packet loss that can exacerbate latency. For example, if the radio bearer has a low priority, discarding the packet may significantly delay retransmission of the lost packet even when radio conditions are good. Similarly, if radio conditions are poor, discarding the packet may significantly delay retransmission of the lost packet even when the radio bearer has a high priority.

The amount of time may be set to a specialized value or a default value. For example, a network entity may configure the amount of time based at least in part on traffic conditions using network slicing or other techniques that request radio bearer setup for particular traffic. However, the network entity may configure a default amount of time when setting up a default radio bearer. The latency may be further exacerbated when the default amount of time is too short for traffic on the default radio bearer. For example, extended reality (XR) and virtual reality (VR) packets may be particularly affected because XR and VR have very strict packet loss budgets, resulting in significant latency when packets are discarded. In another example, transmission control protocol (TCP) packets may be affected because TCP packets must eventually be retransmitted unlike real-time transport protocol (RTP) and/or user datagram protocol (UDP) packets. In addition to TCP, RTP, and/or UDP packets, a PDCP layer may additionally or alternatively discard Ethernet frames (e.g., encoded according to Institute of Electrical and Electronics Engineers (IEEE) standards family 802) and/or unstructured data.

Some techniques and apparatuses described herein enable a radio bearer (such as UE 120 or network entity 401) to re-enqueue packets for transmission before they are discarded by a PDCP layer. As a result, the radio bearer may reduce latency by preventing packet loss before retransmission of those packets. Additionally, or alternatively, some techniques and apparatuses described herein enable a radio bearer (such as UE 120 or network entity 401) to perform early retransmission of packets before they are discarded by a PDCP layer. As a result, the radio bearer may reduce latency between loss of the packets and retransmission of those packets.

As indicated above, FIG. 4 is provided as an example. Other examples may differ from what is described with respect to FIG. 4.

Figure 5:
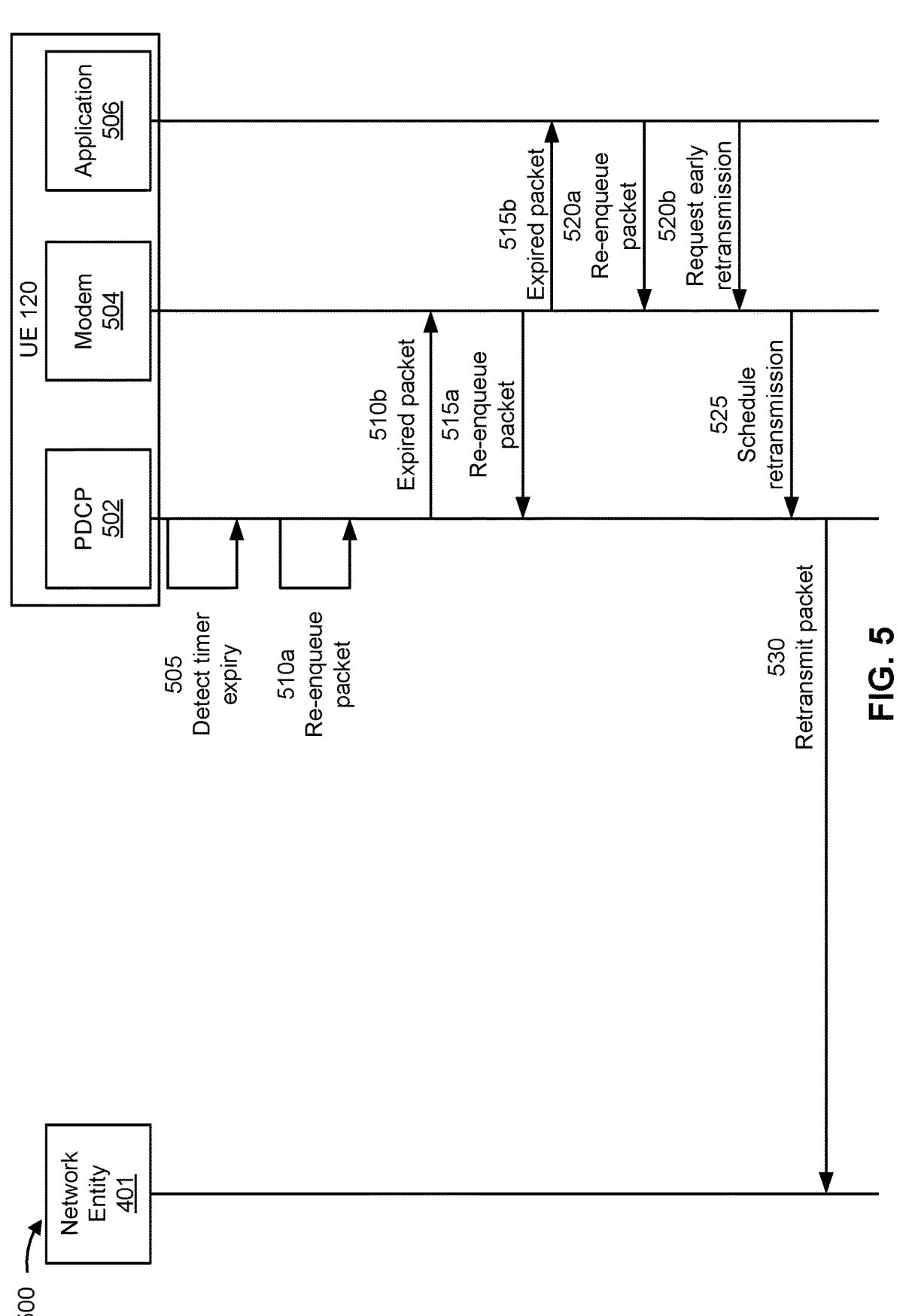
FIG. 5 is a diagram illustrating an example associated with recovery after discard of a packet data convergence protocol (PDCP) packet, in accordance with the present disclosure.

FIG. 5 is a diagram illustrating an example 500 associated with recovery after discard of a PDCP packet, in accordance with the present disclosure. As shown in FIG. 5, example 500 includes communication between a network entity 401 and a UE 120. In some aspects, the network entity 401 and the UE 120 may be included in a wireless network, such as wireless network 100. The network entity 401 and the UE 120 may communicate via a wireless access link, which may include an uplink and a downlink. Although described below using the uplink from the UE 120 (which is a radio bearer in example 500) to the network entity 401, the description similarly applies to the downlink from the network entity 401 (which may be a radio bearer) to the UE 120.

As shown in connection with reference number 505, the UE 120 may detect, at PDCP layer 502, expiry of a timer associated with a packet for transmission. For example, the packet may be for transmission on the uplink to the network entity 401. The PDCP layer 502 may have begun the timer after passing the packet to one or more lower layers of the UE 120 (e.g., an RLC layer and/or a data link layer including at least a MAC layer and a physical layer). The timer may expire because the PDCP layer 502 has not received, from the lower layer(s), confirmation that the network entity 401 received and decoded the packet. For example, the lower layer(s) may have not yet received an ACK from the network entity 401 and/or may have received at least one NACK from the network entity 401.

In some aspects, a value of the timer may be associated with a default radio bearer configuration. As an alternative, the timer may be associated with a specialized (also referred to as "dedicated") radio bearer configuration. In some aspects, the network entity 401 may have transmitted, and the UE 120 may have received, a radio bearer configuration that indicated a value of the timer. For example, the radio bearer configuration may be a PDCP-Config data structure as defined in 3GPP TS 38.331 and/or another standard and may include a discardTimer variable as defined in 3GPP TS 38.331 and/or another standard that indicates the value of the timer.

The UE 120 may be configured to discard the packet upon expiry of the timer (e.g., in accordance with 3GPP TS 38.323 and/or another standard). However, in some aspects, the UE 120 may re-enqueue, based at least in part on detecting expiry of the timer, the packet as a new packet for transmission before the PDCP layer 502 discards the packet. For example, as shown in connection with reference number 510*a*, the PDCP layer 502 may re-enqueue the packet (e.g., by adding the packet to an uplink queue, as described above with respect to FIG. 3, as though it were a new packet). Accordingly, the lower layer(s) of the UE 120 may retransmit the packet sooner than if the PDCP layer 502 had discarded the packet without re-enqueuing.

Additionally, or alternatively, and as shown in connection with reference number 510*b*, the PDCP layer 502 may pass the packet to software associated with a modem 504 before discarding the packet. For example, the software may include a driver associated with the modem 504.

Accordingly, in some aspects, and as shown in connection with reference number 515*a*, the modem 504 may re-enqueue the packet. For example, the modem 504 may re-enqueue the packet by adding the packet to an uplink queue, as described above with respect to FIG. 3, as though it were a new packet. Accordingly, the PDCP layer 502 may retransmit the packet sooner than if the PDCP layer 502 had discarded the packet without the modem 504 re-enqueuing the packet.

Additionally, or alternatively, and as shown in connection with reference number 515*b*, the PDCP layer 502 may pass the packet to an application 506 executed on the UE 120 (e.g., via the modem 504). For example, the application 506 may include an operating system or an application executed on top of the operating system. Accordingly, in some aspects, and as shown in connection with reference number 520*a*, the application 506 may re-enqueue the packet. For example, the application 506 may provide the packet to the modem 504 as though it were new traffic for transmission to the network entity 401. Accordingly, the modem 504 may add the packet to an uplink queue, as described above with respect to FIG. 3, and the PDCP layer 502 may retransmit the packet sooner than if the PDCP layer 502 had discarded the packet without the application 506 re-enqueuing that packet.

Additionally, or alternatively, and as shown in connection with reference number 520*b*, the application 506 may request early retransmission of the packet. In some aspects, the application 506 may duplicate the packet and send instructions to the PDCP layer 502 (e.g., via the modem 504) to retransmit based at least in part on the duplication. For example, the application 506 may provide the duplicated packet to the modem 504 as though it were new traffic for transmission to the network entity 401. Accordingly, as shown in connection with reference number 525, the modem 504 may schedule retransmission of the duplicated packet with the PDCP layer 502. For example, the modem 504 may add the packet to an uplink queue, as described above with respect to FIG. 3, and the network entity 401 may receive the packet sooner than if the PDCP layer 502 had discarded the packet without the application 506 duplicating the packet.

Additionally, or alternatively, the PDCP layer 502 may be configured to retransmit after a threshold quantity of NACK signals (e.g., received from the network entity 401). Accordingly, the instructions from the application 506 may cause the PDCP layer 502 to retransmit the packet based at least in part on fewer NACK signals than the threshold quantity. For example, the PDCP layer 502 may be configured to attempt retransmission of the packet only after receiving (e.g., via the lower layer(s)) three NACKs from the network entity 401. Moreover, if the timer has expired before receiving three NACKs, the PDCP layer 502 may have to request the application 506 to provide the packet again since the PDCP layer 502 will have discarded the packet. Accordingly, the instructions from the application 506 may cause the PDCP layer 502 to attempt retransmission of the packet after only one or two NACKs, such that the network entity 401 may receive the packet sooner than if the PDCP layer 502 had waited until three NACKs to attempt retransmission. Although described above using three as the threshold quantity, the description similarly applies to smaller threshold quantities (such as two) and larger threshold quantities (such as four, five, and so on).

In any of the aspects described above, and as shown in connection with reference number 530, the UE 120 may retransmit, and the network entity 401 may receive, the packet. For example, the UE 120 may retransmit the packet based at least in part on re-enqueuing, as described above. Additionally, or alternatively, the UE 120 may retransmit the packet based at least in part on instructions from the application 506. The UE 120 may use the lower layer(s), as described above, to retransmit the packet to the network entity 401.

In some aspects, the UE 120 may re-enqueue and/or request early retransmission (as described above) based at least in part on a tuple associated with the packet, a flow associated with the packet, a packet delay budget associated with the packet, and/or metadata associated with the packet. For example, the tuple may indicate a source (e.g., an Internet protocol (IP) address associated with the UE 120 and/or a port associated with the UE 120), a destination (e.g., an IP address associated with a server to which the packet is going and/or a port associated with that server), a protocol (e.g., a TCP, an RTP, a UDP, and/or another protocol), and/or additional information associated with the packet. Accordingly, the UE 120 may re-enqueue and/or request early retransmission based at least in part on the destination (e.g., performing re-enqueuing and/or early retransmission for traffic addressed to one server but not another), the protocol (e.g., as described below), and/or other information included in the tuple. Additionally, or alternatively, the UE 120 may re-enqueue and/or request early retransmission based at least in part on a flow associated with the packet (e.g., based at least in part on traffic patterns associated with the packet, such as performing re-enqueuing and/or early retransmission for traffic that has been associated with a threshold quantity of timer expiries in an amount of time). Additionally, or alternatively, the UE 120 may re-enqueue and/or request early retransmission based at least in part on a packet delay budget (PDB) associated with the packet (e.g., performing re-enqueuing and/or early retransmission for traffic that has been associated with a PDB that satisfies a PDB threshold). Additionally, or alternatively, the UE 120 may re-enqueue and/or request early retransmission based at least in part on a type of data associated with the packet (e.g., for XR or VR packets), a packet error loss rate associated with the packet (e.g., performing re-enqueuing and/or early retransmission for traffic that has been associated with a packet error loss rate threshold), and/or metadata associated with the packet.

In some aspects, the packet may be associated with a TCP, an RTP, a UDP, Ethernet, application-specific protocol data, and/or unstructured data. For example, application-specific protocol data may include XR data, VR data, and/or another type of data associated with a protocol specific to one or more applications executed by the radio bearer. Accordingly, the UE 120 may re-enqueue and/or request early retransmission (as described above) based at least in part on a protocol associated with the packet (e.g., the packet being associated with the TCP, Ethernet, application-specific protocol data, and/or unstructured data). Similarly, an additional packet may be associated with a TCP, an RTP, a UDP, Ethernet, application-specific protocol data, and/or unstructured data. Accordingly, the UE 120 may discard the additional packet (e.g., at the PDCP layer 502) based at least in part on detecting expiry of an additional timer associated with the additional packet and based at least in part on a protocol associated with the packet (e.g., the packet being associated with the RTP and/or the UDP). Thus, the UE 120 may reduce latency for traffic where packet loss is not acceptable (e.g., TCP, Ethernet, application-specific protocol data, application-specific protocol data, and/or unstructured data traffic) while keeping network overhead lower for traffic where packet loss is acceptable (e.g., RTP traffic and/or UDP traffic).

By using techniques as described in connection with FIG. 5, the UE 120 (and/or another radio bearer) may re-enqueue packets for transmission before they are discarded by the PDCP layer 502. As a result, the UE 120 may reduce latency by preventing packet loss before retransmission of those packets. Additionally, or alternatively, the UE 120 (and/or another radio bearer) may perform early retransmission of packets before they are discarded by the PDCP layer 502. As a result, the UE 120 may reduce latency between loss of the packets and retransmission of those packets.

As indicated above, FIG. 5 is provided as an example. Other examples may differ from what is described with respect to FIG. 5.

Figure 6:
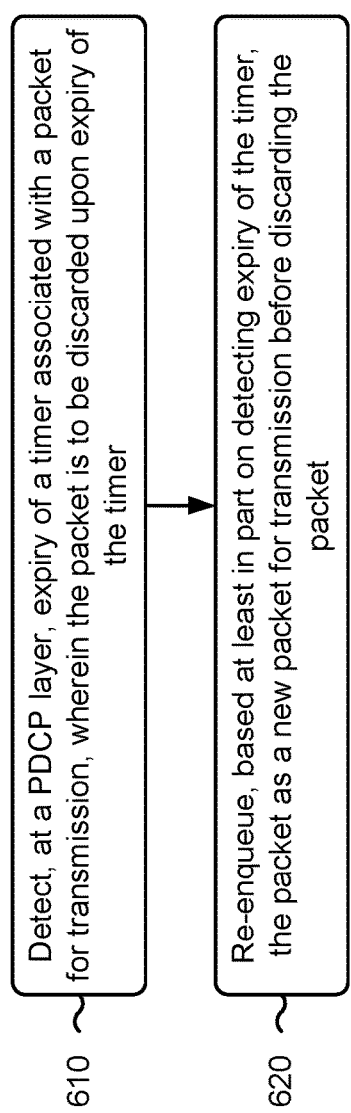
FIGS. 6 and 7 are diagrams illustrating example processes associated with recovery after discard of a PDCP packet, in accordance with the present disclosure.

FIG. 6 is a diagram illustrating an example process 600 performed, for example, by a radio bearer, in accordance with the present disclosure. Example process 600 is an example where the radio bearer (e.g., UE 120 and/or apparatus 800 of FIG. 8, or network entity 401 and/or apparatus 900 of FIG. 9) performs operations associated with recovery after discarding a PDCP packet.

As shown in FIG. 6, in some aspects, process 600 may include detecting, at a PDCP layer, expiry of a timer associated with a packet for transmission (block 610). For example, the radio bearer (e.g., using detection component 808, depicted in FIG. 8) may detect expiry of the timer associated with the packet for transmission, as described above. In some aspects, the radio bearer is configured to discard the packet upon expiry of the timer.

As further shown in FIG. 6, in some aspects, process 600 may include re-enqueuing, based at least in part on detecting expiry of the timer, the packet as a new packet for transmission before discarding the packet (block 620). For example, the radio bearer (e.g., using queuing component 810, depicted in FIG. 8) may re-enqueue, based at least in part on detecting expiry of the timer, the packet as a new packet for transmission before discarding the packet, as described above.

Process 600 may include additional aspects, such as any single aspect or any combination of aspects described below and/or in connection with one or more other processes described elsewhere herein.

In a first aspect, a value of the timer is associated with a default radio bearer configuration or a dedicated radio bearer configuration.

In a second aspect, alone or in combination with the first aspect, the packet is for transmission on an uplink to a network entity.

In a third aspect, alone or in combination with one or more of the first and second aspects, process 600 further includes receiving (e.g., using reception component 802, depicted in FIG. 8), from a network entity, a radio bearer configuration that indicates a value of the timer.

In a fourth aspect, alone or in combination with one or more of the first through third aspects, the packet is for transmission on a downlink to a UE.

In a fifth aspect, alone or in combination with one or more of the first through fourth aspects, the packet is associated with a TCP, an RTP, a UDP, Ethernet, unstructured data, application-specific protocol data, or a combination thereof.

In a sixth aspect, alone or in combination with one or more of the first through fifth aspects, process 600 further includes detecting (e.g., using detection component 808), at the PDCP layer, expiry of an additional timer associated with an additional packet for transmission, and discarding (e.g., using queuing component 810) the additional packet based at least in part on detecting expiry of the additional timer, where the additional packet is associated with a TCP, an RTP, a UDP, Ethernet, unstructured data, application-specific protocol data, or a combination thereof.

In a seventh aspect, alone or in combination with one or more of the first through sixth aspects, the packet is re-enqueued based at least in part on a tuple associated with the packet, a flow associated with the packet, a packet delay budget associated with the packet, or metadata associated with the packet.

In an eighth aspect, alone or in combination with one or more of the first through seventh aspects, the packet is passed from the PDCP layer to software associated with a modem of the radio bearer, and the packet is re-enqueued by the software associated with the modem.

In a ninth aspect, alone or in combination with one or more of the first through eighth aspects, the packet is passed from the PDCP layer to an application executed on one or more processors of the radio bearer, and the packet is re-enqueued by the application.

In a tenth aspect, alone or in combination with one or more of the first through ninth aspects, the packet is re-enqueued by the PDCP layer.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
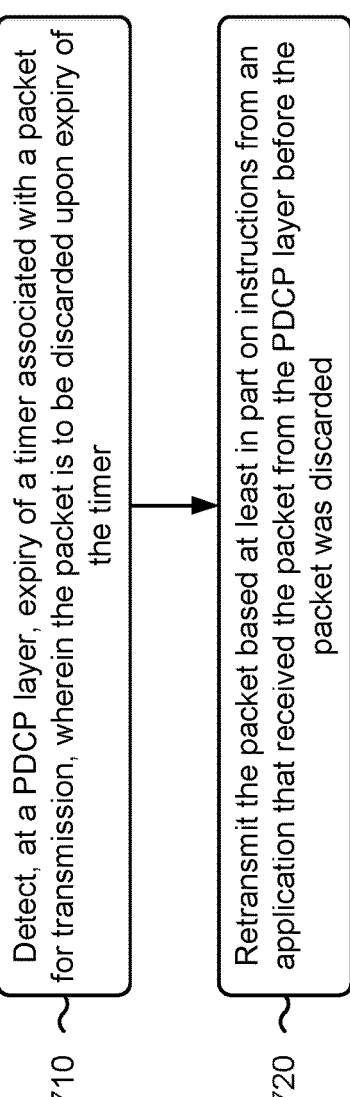

FIG. 7 is a diagram illustrating an example process 700 performed, for example, by a radio bearer, in accordance with the present disclosure. Example process 700 is an example where the radio bearer (e.g., UE 120 and/or apparatus 800 of FIG. 8, or network entity 401 and/or apparatus

Figure 9:
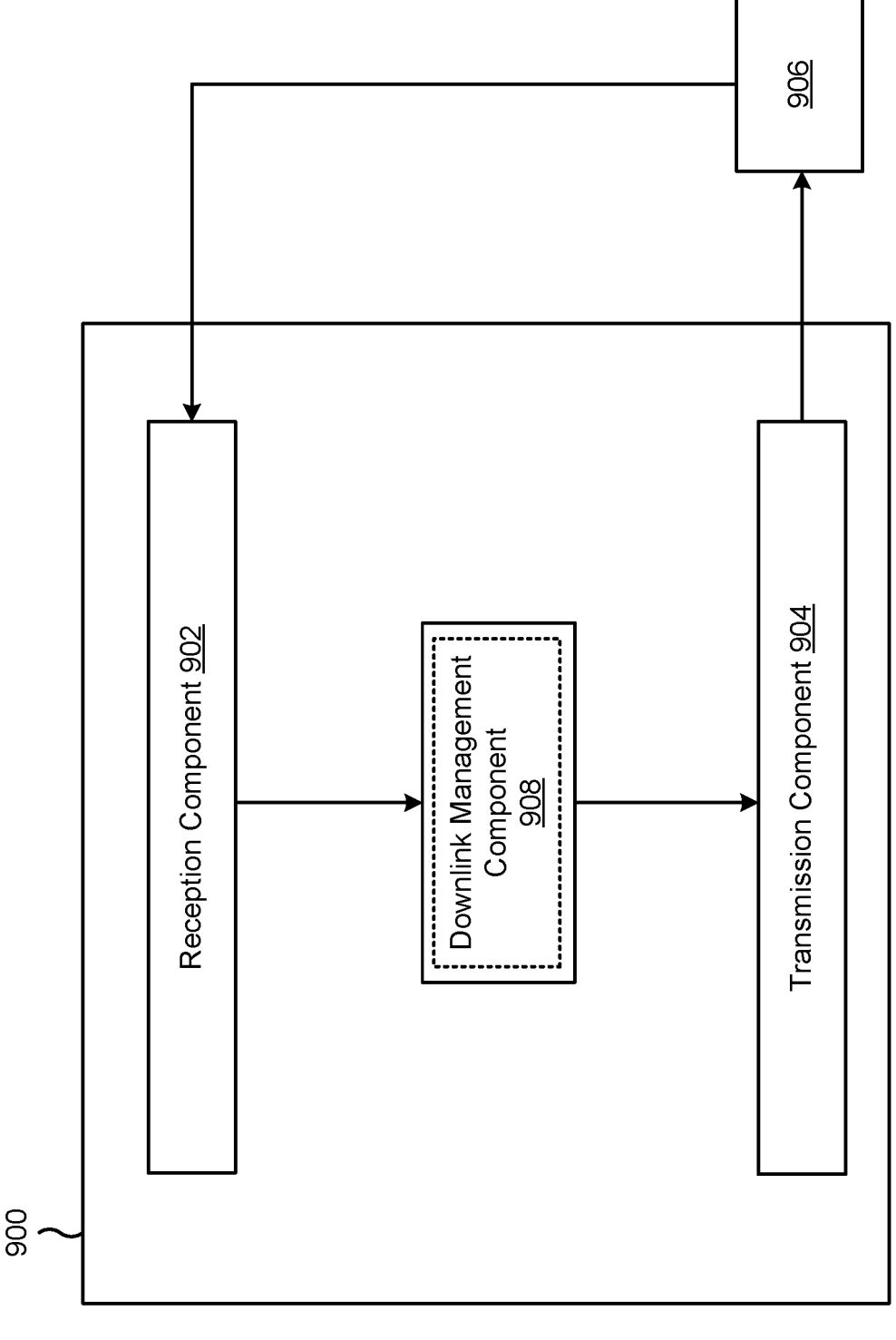

900 of FIG. 9) performs operations associated with recovery after discarding a PDCP packet.

As shown in FIG. 7, in some aspects, process 700 may include detecting, at a PDCP layer, expiry of a timer associated with a packet for transmission (block 710). For example, the radio bearer (e.g., using detection component 808, depicted in FIG. 8) may detect expiry of the timer associated with the packet for transmission, as described above. In some aspects, the radio bearer is configured to discard the packet upon expiry of the timer.

As further shown in FIG. 7, in some aspects, process 700 may include retransmitting the packet based at least in part on instructions from an application, executed on one or more processors of the radio bearer, that received the packet from the PDCP layer before the packet was discarded (block 720). For example, the radio bearer (e.g., using transmission component 804, depicted in FIG. 8) may retransmit the packet based at least in part on instructions from the application that received the packet from the PDCP layer before the packet was discarded, as described above.

Process 700 may include additional aspects, such as any single aspect or any combination of aspects described below and/or in connection with one or more other processes described elsewhere herein.

In a first aspect, a value of the timer is associated with a default radio bearer configuration or a dedicated radio bearer configuration.

In a second aspect, alone or in combination with the first aspect, the packet is for transmission on an uplink to a network entity.

In a third aspect, alone or in combination with one or more of the first and second aspects, process 700 further includes receiving (e.g., using reception component 802, depicted in FIG. 8), from a network entity, a radio bearer configuration that indicates a value of the timer.

In a fourth aspect, alone or in combination with one or more of the first through third aspects, the packet is for transmission on a downlink to a UE.

In a fifth aspect, alone or in combination with one or more of the first through fourth aspects, the packet is associated with a TCP, an RTP, a UDP, Ethernet, unstructured data, application-specific protocol data, or a combination thereof.

In a sixth aspect, alone or in combination with one or more of the first through fifth aspects, process 700 further includes detecting (e.g., using detection component 808), at the PDCP layer, expiry of an additional timer associated with an additional packet for transmission, and discarding (e.g., using queuing component 810, depicted in FIG. 8) the additional packet based at least in part on detecting expiry of the additional timer, where the additional packet is associated with a TCP, an RTP, a UDP, Ethernet, unstructured data, application-specific protocol data, or a combination thereof.

In a seventh aspect, alone or in combination with one or more of the first through sixth aspects, the packet is retransmitted based at least in part on a tuple associated with the packet, a flow associated with the packet, a packet delay budget associated with the packet, or metadata associated with the packet.

In an eighth aspect, alone or in combination with one or more of the first through seventh aspects, the packet is duplicated, and the instructions to retransmit are generated based at least in part on the duplication.

In a ninth aspect, alone or in combination with one or more of the first through eighth aspects, the PDCP layer is configured to retransmit after a threshold quantity of NACK signals, and the packet is retransmitted based at least in part on fewer NACK signals than the threshold quantity.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
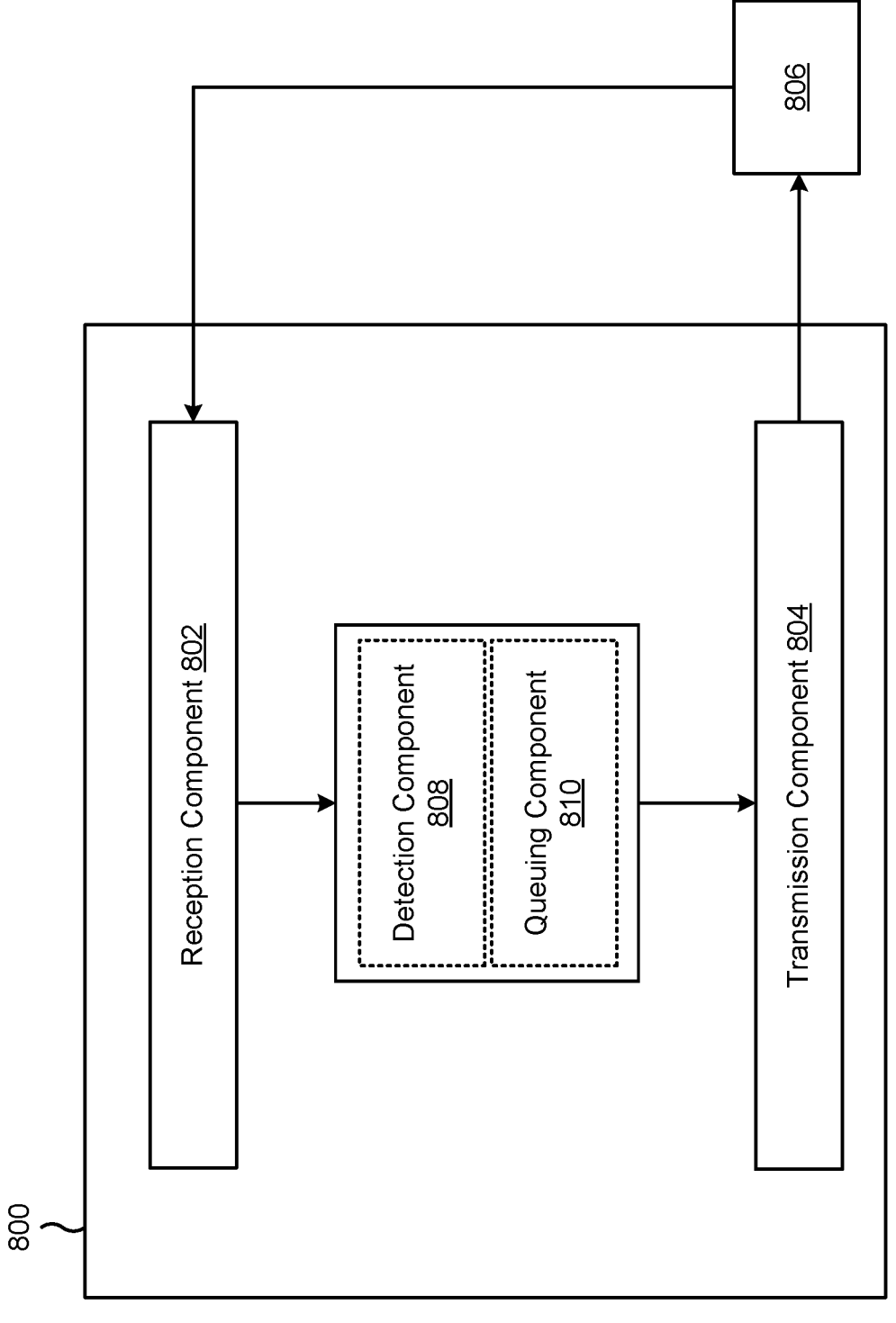
FIGS. 8 and 9 are diagrams of example apparatuses for wireless communication, in accordance with the present disclosure.

FIG. 8 is a block diagram of an example apparatus 800 for wireless communication. The apparatus 800 may be a radio bearer, such as a UE, or a radio bearer may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a detection component 808 or a queuing component 810, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

In some aspects, the detection component 808 may detect, at a PDCP layer, expiry of a timer associated with a packet for transmission. In some aspects, the detection component 808 may include a MIMO detector, a receive processor, a transmit MIMO processor, a transmit processor, a controller/processor, a memory, or a combination thereof, of the UE described above in connection with FIG. 2. The PDCP layer may be configured to discard the packet upon expiry of the timer. Accordingly, the queuing component 810 may re-enqueue, based at least in part on the detection component 808 detecting expiry of the timer, the packet as a new packet for transmission before the PDCP layer discards the packet. In some aspects, the queuing component 810 may include a MIMO detector, a receive processor, a transmit MIMO processor, a transmit processor, a controller/processor, a memory, or a combination thereof, of the UE described above in connection with FIG. 2. Additionally, or alternatively, the transmission component 804 may retransmit the packet (e.g., to the apparatus 806) based at least in part on instructions from an application, executed on the apparatus 800, that received the packet from the PDCP layer before the packet was discarded.

In some aspects, the reception component 802 may receive, from the apparatus 806, a radio bearer configuration that indicates a value of the timer.

In some aspects, the detection component 808 may detect, at the PDCP layer, expiry of an additional timer associated with an additional packet for transmission. Accordingly, the queuing component 810 may discard the additional packet based at least in part on the detection component 808 detecting expiry of the additional timer, where the additional packet is associated with a TCP, an RTP, a UDP, Ethernet, unstructured data, application-specific protocol data, or a combination thereof.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

FIG. 9 is a block diagram of an example apparatus 900 for wireless communication. The apparatus 900 may be a radio bearer, such as a network entity, or a radio bearer may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a downlink management component 908, among other examples.

In some aspects, the apparatus 900 may be configured to perform one or more operations described herein in connection with FIG. 5. Additionally, or alternatively, the apparatus 900 may be configured to perform one or more processes described herein, such as process 600 of FIG. 6, process 700 of FIG. 7, or a combination thereof. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

In some aspects, the downlink management component 908 may detect, at a PDCP layer, expiry of a timer associated with a packet for transmission. In some aspects, the downlink management component 908 may include a transmit MIMO processor, a transmit processor, a controller/processor, a memory, or a combination thereof, of the base station described above in connection with FIG. 2. The PDCP layer may be configured to discard the packet upon expiry of the timer. Accordingly, the downlink management component 908 may re-enqueue, based at least in part on detecting expiry of the timer, the packet as a new packet for transmission before discarding the packet. Additionally, or alternatively, the transmission component 904 may retransmit the packet (e.g., to the apparatus 906) based at least in part on instructions from a data server, connected to the apparatus 900, that received the packet from the PDCP layer before the packet was discarded.

In some aspects, the downlink management component 908 may detect, at the PDCP layer, expiry of an additional timer associated with an additional packet for transmission. Accordingly, the downlink management component 908 may discard the additional packet based at least in part on detecting expiry of the additional timer, where the additional packet is associated with a TCP, an RTP, a UDP, Ethernet, unstructured data, application-specific protocol data, or a combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a radio bearer, comprising: detecting, at a packet data convergence protocol (PDCP) layer, expiry of a timer associated with a packet for transmission, wherein the radio bearer is configured to discard the packet upon expiry of the timer; and re-enqueuing, at a modem of the radio bearer or at an application layer of the radio bearer and based at least in part on detecting expiry of the timer, the packet as a new packet for transmission before discarding the packet.

Aspect 2: The method of Aspect 1, wherein a value of the timer is associated with a default radio bearer configuration or a dedicated radio bearer configuration.

Aspect 3: The method of any of Aspects 1 through 2, wherein the packet is for transmission on an uplink to a network entity.

Aspect 4: The method of Aspect 3, further comprising: receiving, from the network entity, a radio bearer configuration that indicates a value of the timer.

Aspect 5: The method of any of Aspects 1 through 2, wherein the packet is for transmission on a downlink to a user equipment (UE).

Aspect 6: The method of any of Aspects 1 through 5, wherein the packet is associated with a transmission control protocol (TCP), a real-time transport protocol (RTP), a user datagram protocol (UDP), Ethernet, unstructured data, application-specific protocol data, or a combination thereof.

Aspect 7: The method of any of Aspects 1 through 6, further comprising: detecting, at the PDCP layer, expiry of an additional timer associated with an additional packet for transmission; and discarding the additional packet based at least in part on detecting expiry of the additional timer, wherein the additional packet is associated with a transmission control protocol (TCP), a real-time transport protocol (RTP), a user datagram protocol (UDP), Ethernet, unstructured data, application-specific protocol data, or a combination thereof.

Aspect 8: The method of Aspect 7, wherein the application-specific protocol data includes extended reality (XR) data, virtual reality (VR) data, or a combination thereof.

Aspect 9: The method of any of Aspects 1 through 8, wherein the packet is re-enqueued based at least in part on a tuple associated with the packet, a flow associated with the packet, a packet delay budget associated with the packet, or metadata associated with the packet.

Aspect 10: The method of any of Aspects 1 through 9, wherein the packet is passed from the PDCP layer to software associated with a modem of the radio bearer, and the packet is re-enqueued by the software associated with the modem.

Aspect 11: The method of any of Aspects 1 through 9, wherein the packet is passed from the PDCP layer to an application executed on one or more processors of the radio bearer, and the packet is re-enqueued by the application.

Aspect 12: The method of any of Aspects 1 through 9, wherein the packet is re-enqueued by the PDCP layer.

Aspect 13: A method of wireless communication performed by a radio bearer, comprising: detecting, at a packet data convergence protocol (PDCP) layer, expiry of a timer associated with a packet for transmission, wherein the radio bearer is configured to discard the packet upon expiry of the timer; and retransmitting the packet based at least in part on instructions from an application, executed on one or more processors of the radio bearer, that received the packet from the PDCP layer before the packet was discarded.

Aspect 14: The method of Aspect 13, wherein a value of the timer is associated with a default radio bearer configuration or a dedicated radio bearer configuration.

Aspect 15: The method of any of Aspects 13 through 14, wherein the packet is for transmission on an uplink to a network entity.

Aspect 16: The method of Aspect 15, further comprising: receiving, from the network entity, a radio bearer configuration that indicates a value of the timer.

Aspect 17: The method of any of Aspects 13 through 14, wherein the packet is for transmission on a downlink to a user equipment (UE).

Aspect 18: The method of any of Aspects 13 through 17, wherein the packet is associated with a transmission control protocol (TCP), a real-time transport protocol (RTP), a user datagram protocol (UDP), Ethernet, unstructured data, application-specific protocol data, or a combination thereof.

Aspect 19: The method of Aspect 18, wherein the application-specific protocol data includes extended reality (XR) data, virtual reality (VR) data, or a combination thereof.

Aspect 20: The method of any of Aspects 13 through 19, further comprising: detecting, at the PDCP layer, expiry of an additional timer associated with an additional packet for transmission; and discarding the additional packet based at least in part on detecting expiry of the additional timer, wherein the additional packet is associated with a transmission control protocol (TCP), a real-time transport protocol (RTP), a user datagram protocol (UDP), Ethernet, unstructured data, application-specific protocol data, or a combination thereof.

Aspect 21: The method of any of Aspects 13 through 20, wherein the packet is retransmitted based at least in part on a tuple associated with the packet, a flow associated with the packet, a packet delay budget associated with the packet, or metadata associated with the packet.

Aspect 22: The method of any of Aspects 13 through 21, wherein the packet is duplicated, and the instructions to retransmit are generated based at least in part on the duplication.

Aspect 23: The method of any of Aspects 13 through 21, wherein the PDCP layer is configured to retransmit after a threshold quantity of negative-acknowledgement (NACK) signals, and the packet is retransmitted based at least in part on fewer NACK signals than the threshold quantity.

Aspect 24: An apparatus for wireless communication at a device, comprising a processor; memory coupled with the processor; and instructions stored in the memory and executable by the processor to cause the apparatus to perform the method of one or more of Aspects 1-12.

Aspect 25: A device for wireless communication, comprising a memory and one or more processors coupled to the memory, the memory and the one or more processors configured to perform the method of one or more of Aspects 1-12.

Aspect 26: An apparatus for wireless communication, comprising at least one means for performing the method of one or more of Aspects 1-12.

Aspect 27: A non-transitory computer-readable medium storing code for wireless communication, the code comprising instructions executable by a processor to perform the method of one or more of Aspects 1-12.

Aspect 28: A non-transitory computer-readable medium storing a set of instructions for wireless communication, the set of instructions comprising one or more instructions that, when executed by one or more processors of a device, cause the device to perform the method of one or more of Aspects 1-12.

Aspect 29: An apparatus for wireless communication at a device, comprising a processor; memory coupled with the processor; and instructions stored in the memory and executable by the processor to cause the apparatus to perform the method of one or more of Aspects 13-23.

Aspect 30: A device for wireless communication, comprising a memory and one or more processors coupled to the memory, the memory and the one or more processors configured to perform the method of one or more of Aspects 13-23.

Aspect 31: An apparatus for wireless communication, comprising at least one means for performing the method of one or more of Aspects 13-23.

Aspect 32: A non-transitory computer-readable medium storing code for wireless communication, the code comprising instructions executable by a processor to perform the method of one or more of Aspects 13-23.

Aspect 33: A non-transitory computer-readable medium storing a set of instructions for wireless communication, the set of instructions comprising one or more instructions that, when executed by one or more processors of a device, cause the device to perform the method of one or more of Aspects 13-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A radio bearer, comprising:
one or more memories; and
one or more processors, coupled to the one or more memories, individually or collectively configured to:
detect, at a packet data convergence protocol (PDCP) layer of the radio bearer, expiry of a timer associated with a packet for transmission;
pass, by the PDCP layer and when the radio bearer is configured to discard the packet upon expiry of the timer, the packet to software associated with a modem of the radio bearer, or an application executed on the one or more processors of the radio bearer; and re-enqueue the packet, as a new packet for transmission before discarding the packet, based at least in part on:

at least one of: a tuple associated with the packet, traffic patterns associated with the packet, or metadata associated with the packet, and a type of a protocol of a plurality of protocols, the plurality of protocols including a first subset of protocols associated with re-enqueuing the packet and a second subset of protocols associated with discarding the packet, wherein:

the packet is re-enqueued as the new packet by the modem based at least in part on passing the packet to the software, or the packet is re-enqueued as the new packet by the application based at least in part on passing the packet to the application.

2. The radio bearer of claim 1, wherein a value of the timer is associated with a default radio bearer configuration or a dedicated radio bearer configuration.

3. The radio bearer of claim 1, wherein the packet is for transmission on an uplink to a network entity.

4. The radio bearer of claim 3, wherein the one or more processors are further configured to:

receive, from the network entity, a radio bearer configuration that indicates a value of the timer.

5. The radio bearer of claim 1, wherein the packet is for transmission on a downlink to a user equipment (UE).

6. The radio bearer of claim 1, wherein at least one of:

the plurality of protocols includes at least one of a transmission control protocol (TCP), a real-time transport protocol (RTP), or a user datagram protocol (UDP), or the packet is associated with Ethernet, unstructured data, application-specific protocol data, or a combination thereof.

7. The radio bearer of claim 6, wherein the application-specific protocol data includes extended reality (XR) data, virtual reality (VR) data, or a combination thereof.

8. The radio bearer of claim 1, wherein the one or more processors are further configured to:

detect, at the PDCP layer, expiry of an additional timer associated with an additional packet for transmission; and discard the additional packet based at least in part on detecting expiry of the additional timer.

9. The radio bearer of claim 1, wherein the packet is re-enqueued based at least in part on the tuple associated with the packet.

10. The radio bearer of claim 1, wherein the packet is passed from the PDCP layer to the software, and the packet is re-enqueued by the software.

11. The radio bearer of claim 1, wherein the packet is passed from the PDCP layer to the application, and the packet is re-enqueued by the application.

12. The radio bearer of claim 1, wherein the one or more processors are further configured to:

begin the timer after passing the packet to one or more lower layers of the radio bearer, wherein expiry of the timer is detected after beginning the timer and at one of:

a failure to receive an acknowledgement during the timer, or a receipt of a negative acknowledgement during the timer.

13. The radio bearer of claim 1, wherein the packet is re-enqueued based at least in part on the metadata.

14. A radio bearer, comprising:

one or more memories; and one or more processors, coupled to the one or more memories, individually or collectively configured to:

detect, at a packet data convergence protocol (PDCP) layer, expiry of a timer associated with a packet for transmission;

pass, by the PDCP layer and when the radio bearer is configured to discard the packet upon expiry of the timer, the packet to an application executed on the one or more processors of the radio bearer;

duplicate, by the application, the packet before discarding the packet, wherein the packet is duplicated based at least in part on a type of a protocol of a plurality of protocols, the plurality of protocols including a first subset of protocols associated with duplicating the packet and a second subset of protocols associated with discarding the packet;

send, by the application and based at least in part on duplicating the packet, instructions to the PDCP layer to retransmit the packet; and retransmit, by the PDCP layer and based at least in part on the instructions, the packet, wherein the packet is retransmitted based at least in part on a tuple associated with the packet, traffic patterns associated with the packet, or metadata associated with the packet.

15. The radio bearer of claim 14, wherein a value of the timer is associated with a default radio bearer configuration or a dedicated radio bearer configuration.

16. The radio bearer of claim 14, wherein the packet is for transmission on an uplink to a network entity.

17. The radio bearer of claim 14, wherein the packet is for transmission on a downlink to a user equipment (UE).

18. The radio bearer of claim 14, wherein:

the protocol is a transmission control protocol (TCP), a real-time transport protocol (RTP), or a user datagram protocol (UDP), or the packet is associated with Ethernet, unstructured data, application-specific protocol data, or a combination thereof.

19. The radio bearer of claim 14, wherein the one or more processors are further configured to:

detect, at the PDCP layer, expiry of an additional timer associated with an additional packet for transmission; and discard the additional packet based at least in part on detecting expiry of the additional timer.

20. The radio bearer of claim 14, wherein the packet is retransmitted based at least in part on the tuple associated with the packet.

21. The radio bearer of claim 14, wherein the PDCP layer is configured to retransmit after a threshold quantity of negative-acknowledgement (NACK) signals, and the packet is retransmitted based at least in part on fewer NACK signals than the threshold quantity.

22. A method of wireless communication performed by a radio bearer, comprising:

detecting, at a packet data convergence protocol (PDCP) layer of the radio bearer, expiry of a timer associated with a packet for transmission;

passing, by the PDCP layer and when the radio bearer is configured to discard the packet upon expiry of the timer, the packet to software associated with a modem of the radio bearer, or an application executed on the radio bearer; and re-enqueuing the packet, as a new packet for transmission before discarding the packet, based at least in part on:

at least one of: a tuple associated with the packet, traffic patterns associated with the packet, or metadata associated with the packet, and a type of a protocol of a plurality of protocols, the plurality of protocols including a first subset of protocols associated with re-enqueuing the packet and a second subset of protocols associated with discarding the packet, wherein:

the packet is re-enqueued as the new packet by the modem based at least in part on passing the packet to the software, or the packet is re-enqueued as the new packet by the application based at least in part on passing the packet to the application.

23. The method of claim 22, wherein the packet is passed from the PDCP layer to the software, and the packet is re-enqueued by the software.

24. The method of claim 22, wherein the packet is passed from the PDCP layer to the application, and the packet is re-enqueued by the application.

25. A method of wireless communication performed by a radio bearer, comprising:

detecting, at a packet data convergence protocol (PDCP) layer, expiry of a timer associated with a packet for transmission;

passing, by the PDCP layer and when the radio bearer is configured to discard the packet upon expiry of the timer, the packet to an application executed on the radio bearer;

duplicating, by the application, the packet before discarding the packet, wherein the packet is duplicated based at least in part on a type of a protocol of a plurality of protocols, the plurality of protocols including a first subset of protocols associated with duplicating the packet and a second subset of protocols associated with discarding the packet;

sending, by the application and based at least in part on duplicating the packet, instructions to the PDCP layer to retransmit the packet; and retransmitting, by the PDCP layer and based at least in part on the instruction, the packet, wherein the packet is retransmitted based at least in part on a tuple associated with the packet, traffic patterns associated with the packet, or metadata associated with the packet.

26. The method of claim 25, wherein the packet is retransmitted based at least in part on the tuple associated with the packet.

27. The method of claim 25, wherein the PDCP layer is configured to retransmit after a threshold quantity of negative-acknowledgement (NACK) signals, and the packet is retransmitted based at least in part on fewer NACK signals than the threshold quantity.

28. The method of claim 22, wherein a value of the timer is associated with a default radio bearer configuration or a dedicated radio bearer configuration.

29. The method of claim 25, wherein a value of the timer is associated with a default radio bearer configuration or a dedicated radio bearer configuration.

\* \* \* \* \*